United States Patent [19]

Rössler et al.

[11] Patent Number: 4,615,186
[45] Date of Patent: Oct. 7, 1986

[54] CAM GEAR FOR TEXTILE MACHINES, ESPECIALLY FOR PATTERN CONTROLLING OF CHAIN STITCHING MACHINES

[75] Inventors: Jürgen Rössler; Hans Dresig, both of Karl Marx Stadt; Manfred Hertzsch, Limbach-Oberfrohna; Günther Förster, Karl Marx Stadt; Franz-Christian Eckelmann, Limbach-Oberfrohna, all of German Democratic Rep.

[73] Assignee: VEB Kombinat Textima, Karl Marx Stadt, German Democratic Rep.

[21] Appl. No.: 624,659

[22] Filed: Jun. 26, 1984

[30] Foreign Application Priority Data

Aug. 31, 1983 [DD] German Democratic Rep. ... 254362

[51] Int. Cl.$^4$ ................................. D04B 9/00
[52] U.S. Cl. ........................... 66/57; 66/203; 66/204; 66/207; 66/78
[58] Field of Search .................. 66/203, 204, 207, 57, 66/78

[56] References Cited

U.S. PATENT DOCUMENTS

3,673,813  7/1972  Havronek ............................. 66/57
4,003,221  1/1977  Mishcon ............................... 66/57

FOREIGN PATENT DOCUMENTS

2125835  12/1983  United Kingdom .................... 66/57

OTHER PUBLICATIONS

Black, Part I, "The Design and Performance of High Speed Knitting Cams", 7/1970, *Journal of Textile Institute*, vol. 61, No. 7.

"New Cam Design can Boost Knitting Mc Speeds", *The Hosiery Trade Journal*, vol. 74, No. 883.

Henshaw, "Cam Forces in Weft Knitting", *Textile Research Journal*, pp. 592–598.

*Primary Examiner*—Ronald Feldbaum
*Assistant Examiner*—Mary A. Ellis
*Attorney, Agent, or Firm*—Jordan and Hamburg

[57] ABSTRACT

Cam gear for textile machines, especially for pattern controlling of warp-knitting (chain stitching) machines. Generally, the development concerns a cam gear for textile machines having cams. The present configuration avoids the interferences, caused by oscillations, in the cam gears of textile machines. One advantage is that the occurring oscillations are influenced, and resonance phenomena are avoided, within the practical range of the normal rotation speed of textile machines. The present development accomplished a result, whereby the rest areas of the cam profile of the cam are configured as curved rest area, of which each individual one has a variable rest height, which corresponds only in one single point with the required rest height, and which is assigned to each curved rest area, in reference to the reversal of the direction of movement of the transition, as well as to each curved rest area, in reference to a range of transition without displacement, to a portion of the cam which exceeds the corresponding rest height. The cam gear is utilizable for the gear systems of the working mechanism of textile machines, for instance for pattern controlling of warp-knitting machines, i.e., chain stitching machines.

5 Claims, 6 Drawing Figures

CAM GEAR FOR TEXTILE MACHINES, ESPECIALLY FOR PATTERN CONTROLLING OF CHAIN STITCHING MACHINES

BACKGROUND OF THE INVENTION AND PRIOR ART STATEMENT

The invention concerns cam gears for textile machines, especially for pattern controlling of warp-knitting machines provided with cams having rest and transition areas.

Known embodiments of cam gears, for instance for controlling displacement of guide bars of a warp-knitting machine, consist of a cam, a cam-follower and transfer elements for the guide bar. The cam profile consists of various alternately arranged rest and transistion areas, wherein the rest areas theoretically represent stops for the cam follower, and the transition areas are provided with shapes for achieving a jerk-free and jolt-free movement for the cam follower, whereof the general functioning is known in the technical literature (VDI-Richtlinie No. 2143, table 1, page 5, anthology (Editor J. Volmer): Getriebetechnik-Lehrbuch, 4. edition 1980, page 359).

These cam profiles are evaluated and selected according to kinematic values. For the motion of the transfer element, a curve is determined which lies between the two adjacent rest areas, the extreme values of which are located at the transition points of the rest areas i.e. no further maximum or minimum points are permitted between the two rest areas. It is important that the transition points are located on the first lead-in derivation.

Because of the finite rigidity of the transfer elements of the cam gear in conjunction with the working mechanism, they form an oscillating system of which the lowest oscillating frequency cannot be increased freely.

For this reason, in conventional cam gears, the transfer elements receive at the rest area oscillations which frequently result in the periodically repeating unstable transition conditions. Because of the occurring oscillations, the rest is not theoretically attained, and the working mechanism does not remain in the required resting position and executes undesired additional movements. Along with the resonance phenomena errors occur in the rest area which can cause, for instance, interferences in the stitch formation process in fast running warp-knitting machines.

In similar fashion, oscillations occurring in cam gears of textile machines cause transition movements between rest areas. The attainable normal speed is thereby often limited, i.e. malfunctions occur.

SUMMARY OF THE INVENTION

An object of the invention is to avoid oscillation induced disturbances or interferences in the cam gears of textile machines provided with alternately formed rest and transition areas, and to thereby allow an increased speed of rotation, and/or an improvement of reliability thereof.

Another object is to influence the occurring oscillations in cam gears for textile machines in which the cam profiles are provided wih alternately formed rest and transition areas, and to avoid the resonance phenomena within the practical range of normal rotation speed of the textile machine.

A further object is to provide a cam gear for textile machines, which is utilizable for the gear systems of the working mechanisms of textile machines, for instance for pattern controlling of warp knitting machines, i.e., chain stitching machine.

These and other objects and advantages of the present invention will become evident from the description which follows.

According to the invention, the problem is solved, wherein the rest areas of the cam profiles are configured as curved rest areas, of which each one is provided with a variable rest height and one single point coincides with the required rest height. The point is assigned to each range of the curved rest area in accordance with condition that the transition area is provided with an area of reversal of the direction of movement or the transition area is not provided with such a reversal area, a portion of the curved rest area exceeding the respective height.

The working mechanism, for instance the guide bars of a warp-knitting machine, execute an actual movement which is changed with respect to the curve profile, because of the superposed oscillations. The curved rest area results in connection with the cam profile of the invention as a simple swinging movement, which consists of, respectively, only a first and a second, oppositely directed swinging amplitude, whereby its maximal magnitude is derived from the tolerance of the height of the rest area.

The subsequent transition is continued in the same direction as the previous transition area, if an intermediary rest area is present after the second swinging deflection. If the transition occurs in reverse direction relative to the previous transition, the movement continues by means of a portion of the cam which exceeds the height of the rest area, as an additional movement in the same direction, up to the curve-shaped transition area in the new direction of movement.

Therefore, the cam profile does not have any discontinuity. The curve portion can be configured either before or after the respective rest area, however, only on one side thereof. The magnitude of this additional movement depends on the relative position of the rest areas to each other, and can be considerably greater than the actual kinematically required rest height difference, for instance it can amount to more than two needle separations during the displacement movement of the guide bars of a warp-knitting machine. The height of the entire cam profile s(x), and the magnitude of the cam portion which exceeds the respective rest height, can especially advantageously be determined by a finite trigonometric series, which is limited to a minimum number of terms, and which describes the cam profile including all rests and all transition movement for the entire length of the cycle L.

The mathematical function therefore is $$s(x) = s_o + \sum_{k=1}^{m} \left( a_k \cos \frac{2\pi kx}{L} + b_k \sin \frac{2\pi kx}{s,24\ L} \right)$$

whereby
$s_o$ = the median height of the cam profile
$x$ = the running coordinate of the cam
$L$ = the length of the cycle
$a_k$:$b_k$ = coefficients The coefficients are derived from the requirements of the best rest areaa, at a limited number m of the terms of the sum of the trigonometric series. Its magnitude depends on the height of the rest areas, the width of the rest areas, the width of the transition areas, and the allowable rest tolerances. If i is an even number of the rest areas present, in the length of the cycle, then the amount of the terms of the sum of the trigonometric series is accordingly $$m \leq \frac{3i}{2}.$$

In this case, it is possible that, because of the elasticity of the transition elements, each rest area corresponds in 3 points with the ideal rest area at higher speeds of rotation. With this number m, it is possible that the allowable range of speed of rotation can be extended, at the most, up to the first critical range of speed of rotation. The critical range of speed of rotation depends on the lowest proper frequency $f_1$ and the highest order m. It lies at $$n_{crit} < \frac{f_1}{m}.$$

According to the invention, the cam profiles do not contain any discontinuities in the higher derivations. Not only the first, second ("jolt-free") and third ("jerk-free"), but all derivations are converted on all joints continuously into each other. Cam gears according to this invention have the advantage that they allow considerably higher practical ranges of normal speed at improved reliability.

BRIEF DESCRIPTION OF THE DRAWINGS

The exemplified embodiment of the invention of the pattern gear of a chain warp-knitting machine is further explained by means of the corresponding drawings which illustate.

DETAILED DESCRIPTION OF THE PREFERRED EMBODIMENTS

Figure 1:
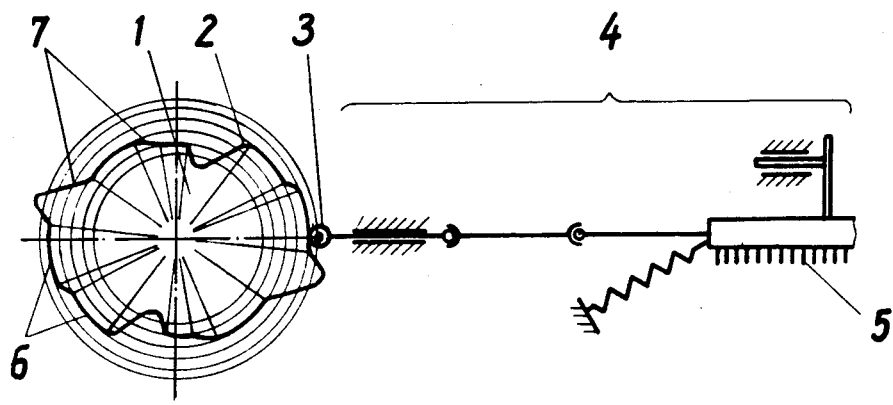
FIG. 1: a cam gear according to the invention for pattern controlling of a warp-knitting or chain stitching machine.

The present invention is characterized by the provision of a cam gear for textile machines, especially for pattern controlling of warp-knitting or chain stitching machines having directly scannable cams with alternating rest and transition areas, in which, each time two rest areas are connected with each other by a transition area in the same movement direction as the previous transition, a transition area in reverse movement direction of the previous transition area, or by a transition area without displacement; the cam gear entails a cam configured with a cam profile, a cam follower and subsequent transmission elements. The rest area of the cam profile (2) of the cam (1) are configured as curved rest area (8), of which each individual one has a variable rest height, which corresponds only in one single point (9) with the required rest height, and in which, to each curved rest area in reference to reversal of the movement of direction of the transition, as well as to each curved rest area, in reference to a transition area without displacement, a corresponding portion of the curve (15) which exceeds the respective rest height is assigned.

Typically, in a preferred embodiment, in the present cam gear, the portion of the curve (15), which exceeds the respective rest height, of the curved rest area (8), is disposed immediately adjacent in the transition area. Preferably, in the cam gear, the portion of the curve (15) is provided only on one side of the curved rest area (8). Generally, two curve portions (15), which are between curved rest areas (8), and are disposed in the same direction, are formed as a joint curve section (17).

One preferred mode of characterizing the present cam gear is that the cam profile s(x) of the cam can be described in its closed form by a trigonometric series consisting of few terms $$s(x) = s_o + \sum_{k=1}^{m} \left( a_k \cos \frac{2\pi k x}{L} + b_k \sin \frac{2\pi k x}{s,24\,L} \right)$$

of which the highest order m is derived from the number i of the rests required during a revolution of the cam, according to, and describable by $$m \leq \frac{3}{2} i.$$

Figure 2:
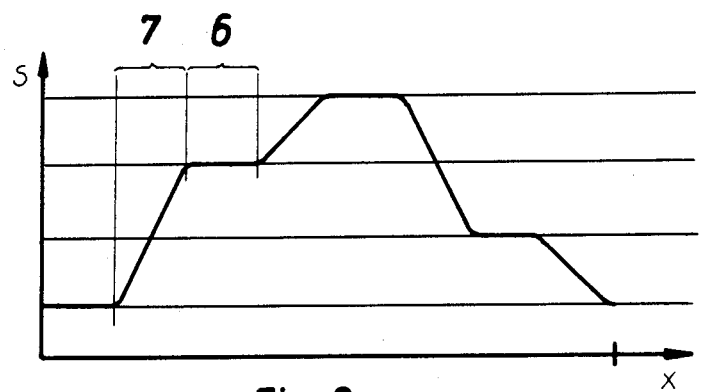
FIG. 2: the cam profile of a conventional cam gear for pattern controlling of a warp-knitting machine.
Figure 3:
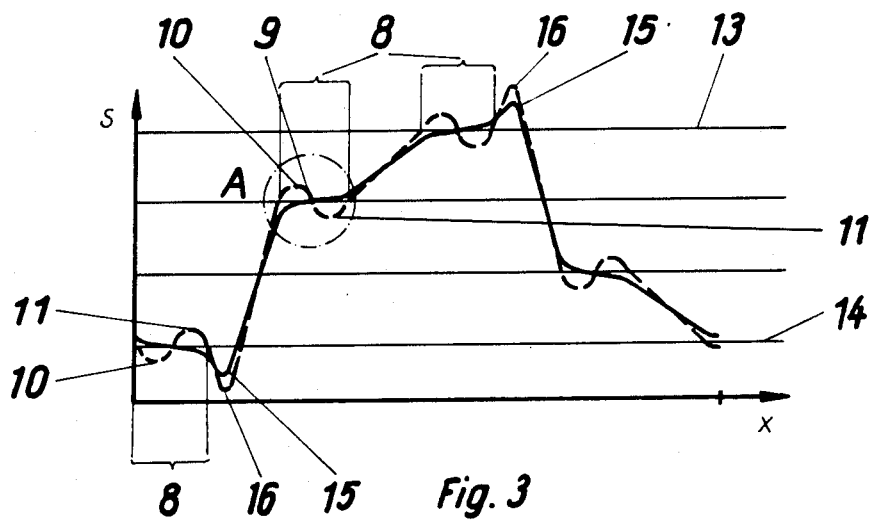
FIG. 3: the cam profile and the actual movement curve of the working elements of a cam gear according to the invention.
Figure 4:
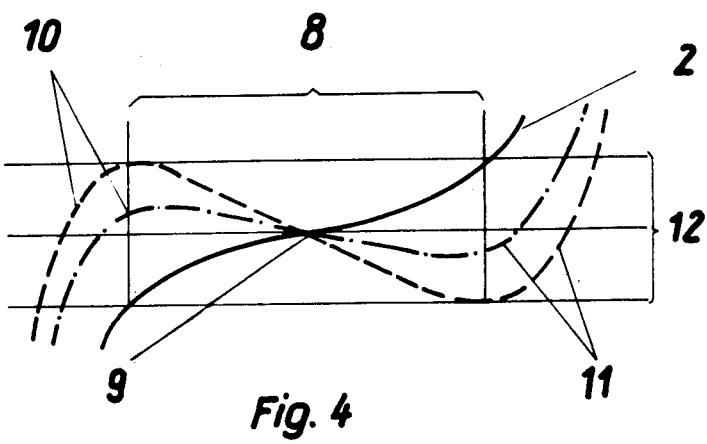
FIG. 4: a detail "A" of FIG. 3, FIG. 5: a variation of the curve profile according to the invention of FIG. 3, and FIG. 6: a representation of the resonance points of a cam gear with and without application of the invention.

Referring now to the drawings, cam gears as described according to FIG. 1 consist of a cam 1, which is configured with a cam profile 2, a cam follower 3, transmission elements 4 and working mechanisms 5, to which is transferred the movement according to the cam profile. According to the required displacement movement, the cam profile is configured with alternating rest areas 6 and transition areas 7. The typical conventional cam profile at present is represented diagrammatically in FIG. 2. The cam profile 2 of the cam gear according to the invention is configured only with curved rest areas 8. The curved rest areas 8 have a variable height, which each time corresponds only in one point 9 with the height of the required rest. Because of the superposed oscillations in the system, the actual movement curve of the working mechanisms 5 is shifted relative to the cam profile 2, and has in each rest area a first swinging deflection 10 and a second opposite swinging deflection 11, as can be seen in FIG. 3. The oscillations are limited by the maximal tolerance 12 (FIG 4).

Each curved rest area in reference to reversal of the direction of movement of the transition, as well as each curved rest area in reference to a range of the transition area without displacement, is assigned a curve portion 15 which exceeds the individual rest height 13, 14.

Figure 5:
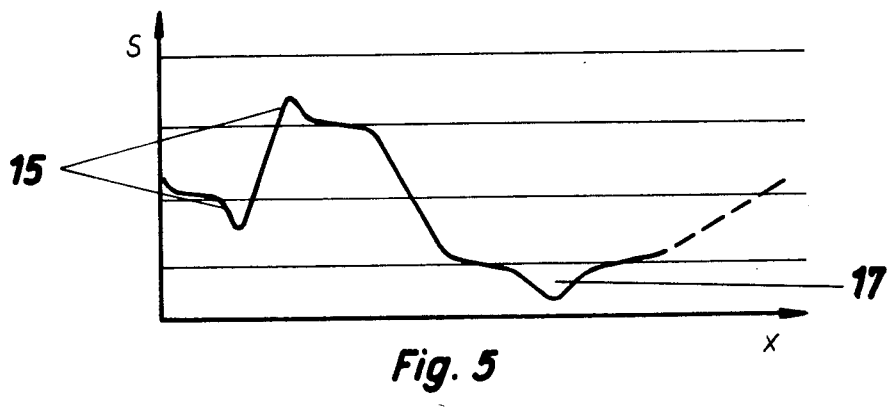

The elasticity of the transmission elements 4, in the range of the curve portion 15, leads to an actual movement 16. This curve portion 15 is positioned immediately adjacent to the curved rest area 8, in the transition area, and is possible before or after the respective rest area. FIG. 5 furthermore illustrates a joint curve portion 17, which is formed by two adjacently lying curve portions going in the same direction.

Figure 6:
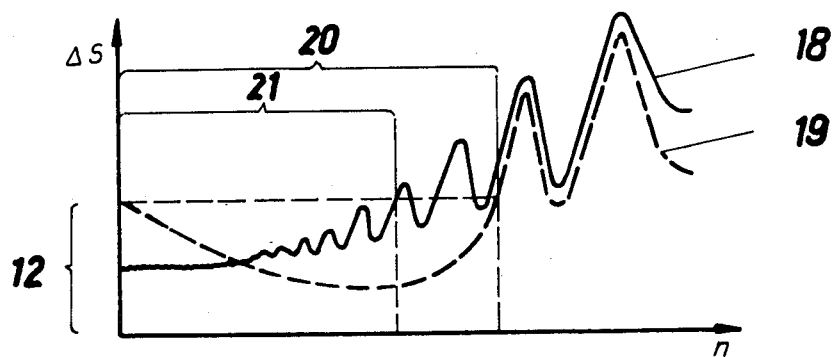

FIG. 6 shows the maximum rest deviations 18, 19 from the ideal rest height, in the range of the curved rest area 8, depending on the normal speed n. The curve 18 corresponds to a conventional cam gear, and the curve 19 to the cam gear of the invention. The possible practical range of normal speed 20 of the cam gear of the invention is greater than the practical range of normal speed 21 of a conventional cam gear. With an increasing normal working speed, the rest deviation is decreased at first. Only when it approaches the maximal normal speed, does it approach the allowable tolerance.

In summary, the present invention typically entails the provision of a cam gear for textile machines, especially for pattern controlling of warp-knitting (chain stitching) machines. Generally, the development concerns a cam gear for textile machines having cams. The present configuration avoids the interferences, caused by oscillations, in the cam gears of textile machines. One advantage is that the occurring oscillations are influenced, and resonance phenomena are avoided, within the practical range of the normal rotation speed of textile machines. The present development accomplishes a result, whereby the rest areas of the cam profile of the cam are configured as curved rest area, of which each individual one has a variable rest height, which corresponds only in one single point with the required rest height, and which is assigned to each curved rest area, in reference to the reversal of the direction of movement of the transition, as well as to each range of the curved rest area, in reference to a transition area without displacement, to a portion of the cam which exceeds the corresponding rest height. The cam gear is utilizable for the gear systems of the working mechanism of textile machines, for instance for pattern controlling of warp-knitting machines, i.e., chain stitching machines.

It thus will be seen that there is provided a cam gear for textile machines which attains the various objects of the invention, and which is well adapted to meet the conditions of practical use. As numerous alternatives within the scope of the present invention will occur to those skilled in the art, besides those alternatives, equivalents, embodiments and variations mentioned supra and shown in the drawings, it will be understood that the present invention extends fully to all such equivalents and the like, and is to be limited only by the scope of the appended claims, and functional and structural equivalents thereof, especially with regard to the various elements, members, terms and formulas employed supra in elucidating the invention.

We claim:

1. A cam gear for pattern controlling of a textile machine, said textile machine comprising a warp-knitting machine having directly scannable cams with alternating rest and transition areas, which comprises a cam having a cam profile, a cam follower, and subsequent transmission elements, so that, respective two rest areas are connected with each other by transition area in the movement direction of a previous transition, or by a transition area without displacement, the rest areas of the cam profile of said cam are, curved rest areas, each individual one of said curved rest areas having a variable rest height, said variable rest height corresponding to only one single point with the required rest height, and in which a corresponding portion of the control curve of said cam profile, said control curve portion exceeding the respective individual rest height, is assigned to each one of said curved rest areas, both in reference to reversal of the direction of movement of the transition and in reference to a transition area without displacement.

2. The cam gear of claim 1, in which the portion of the control curve which exceeds the respective rest height of the curved rest area is disposed immediately adjacent a transition area.

3. The cam gear of claim 1, in which the control curve portion is provided only on one side of the curved rest area.

4. The cam gear of claim 1, in which the two control curve portions are provided, said two portions being between curved rest areas, and said two portions being disposed in the same direction and formed as a joint control curve section.

5. The cam gear of claim 1, in which the cam profile S(X) of the cam has a closed form, said closed form of the cam profile S(X) being within the parameters of a trigonometric series equation of the form:

$$s(x) = s_o + \sum_{k=1}^{m} \left( a_k \cos \frac{2\pi k x}{L} + b_k \sin \frac{2\pi k x}{s,24\ L} \right)$$

the highest order m in said equation being derived from the number i of the rest areas required during a revolution of the cam, in accordance with an equation of the form $$m \leq \frac{3}{2} i.$$

* * * * *